United States Patent
Ang et al.

(10) Patent No.: US 9,872,252 B1
(45) Date of Patent: Jan. 16, 2018

(54) DISCONTINUOUS RECEPTION MODE WITH MULTIPLE-STAGE WAKE-UP

(71) Applicant: QUALCOMM Incorporated, San Diego, CA (US)

(72) Inventors: Peter Pui Lok Ang, San Diego, CA (US); Amir Aminzadeh Gohari, Sunnyvale, CA (US); Alexei Yurievitch Gorokhov, San Diego, CA (US); Raghu Narayan Challa, San Diego, CA (US); Tingfang Ji, San Diego, CA (US); Krishna Kiran Mukkavilli, San Diego, CA (US); Ravi Agarwal, San Diego, CA (US); Joseph Binamira Soriaga, San Diego, CA (US); Hao Xu, San Diego, CA (US)

( * ) Notice: Subject to any disclaimer, the term of this patent is extended or adjusted under 35 U.S.C. 154(b) by 0 days.

(21) Appl. No.: 15/459,758

(22) Filed: Mar. 15, 2017

Related U.S. Application Data

(60) Provisional application No. 62/402,816, filed on Sep. 30, 2016.

(51) Int. Cl.
*G08C 17/00* (2006.01)
*H04W 52/02* (2009.01)
(Continued)

(52) U.S. Cl.
CPC ... *H04W 52/0235* (2013.01); *H04W 52/0216* (2013.01); *H04W 72/0406* (2013.01);
(Continued)

(58) Field of Classification Search
CPC ......... H04W 52/0235; H04W 52/0216; H04W 72/0406; H04W 76/048; H04W 88/02; H04W 88/08
(Continued)

(56) References Cited

U.S. PATENT DOCUMENTS

| | | | |
|---|---|---|---|
| 2005/0026582 A1* | 2/2005 | Carsello | H04W 52/0235 |
| | | | 455/227 |
| 2014/0198699 A1* | 7/2014 | Makharia | H04W 52/0216 |
| | | | 370/311 |

(Continued)

OTHER PUBLICATIONS

International Search Report and ISA/EPO and Written Opinion—PCT/US2017/049147—ISA/EPO—Nov. 7, 2017.

(Continued)

*Primary Examiner* — Peter Cheng
(74) *Attorney, Agent, or Firm* — Qualcomm IP Dept.; James Hunt Yancey, Jr.

(57) ABSTRACT

Systems and method of embodiments herein operate to conserve battery power of user equipment (UE). Embodiments determine whether waking up a UE receiver would be beneficial and based on the determination, the UE either wakes up the receiver or returns to sleep. Embodiments determine whether to wake up the receiver by performing pre-wake up (PWU) operation which either wakes up the receiver in a low power mode or wakes up the UE's wake up receiver. It may be determined whether a wake up (WU) signal is received during a PWU stage. If a WU signal is received during the PWU stage the UE may perform a full wake up of the receiver. If a WU signal is not received the UE may return to idle mode. In embodiments, WU (Wake Up) DRX cycles are supplemented with a Full DRX (Discontinuous Reception) cycle.

30 Claims, 9 Drawing Sheets

(51) Int. Cl.
*H04W 76/04* (2009.01)
*H04W 72/04* (2009.01)
H04W 88/08 (2009.01)
H04W 88/02 (2009.01)

(52) U.S. Cl.
CPC .......... *H04W 76/048* (2013.01); *H04W 88/02* (2013.01); *H04W 88/08* (2013.01)

(58) Field of Classification Search
USPC ....................................................... 370/311
See application file for complete search history.

(56) References Cited

U.S. PATENT DOCUMENTS

| | | | |
|---|---|---|---|
| 2015/0146678 A1* | 5/2015 | Kondylis | H04L 5/0073 370/330 |
| 2016/0007292 A1* | 1/2016 | Weng | H04W 52/0235 370/311 |
| 2016/0127995 A1 | 5/2016 | Merlin et al. | |
| 2016/0128128 A1 | 5/2016 | Ang et al. | |

OTHER PUBLICATIONS

Yomo H., et al, "Receiver Design for Realizing On-Demand WiFi Wake-Up Using WLAN Signals", Global Communications Conference (GLOBECOM), IEEE, Dec. 3, 2012 (Dec. 3, 2012), pp. 5206-5211, XP032375504, DOI: 10.1109/GLOCOM.2012.6503947, ISBN: 978-14673-0920-2.

\* cited by examiner

DISCONTINUOUS RECEPTION MODE WITH MULTIPLE-STAGE WAKE-UP

CROSS-REFERENCE TO RELATED APPLICATIONS

This application claims the benefit of priority to U.S. Provisional Patent Application Ser. No. 62/402,816, entitled, "DISCONTINUOUS RECEPTION MODE WITH TWO-STAGE WAKE-UP," filed on Sep. 30, 2016, the disclosure of which is hereby incorporated by reference herein in its entirety as if fully set forth below and for all applicable purposes.

TECHNICAL FIELD

Aspects of the present disclosure relate generally to wireless communication systems, and more particularly, to radio resource management. Certain embodiments of the technology discussed below can enable and provide features and techniques for efficient and power-conserving communication systems.

INTRODUCTION

As user equipment (UE) get smaller and the services offered thereon grow, the real estate of hardware within the UE becomes more and more scarce and expensive. That being said, user's also desire that their UE have increased battery life. While the obvious solution to increasing battery life is to include a larger battery that stores more energy, such a solution is limited by the aforementioned real estate issues. As such, rather than increasing battery life by via battery size and storage capacity, the industry has begun attempting to increase battery life by reducing the UE's power consumption. Using such techniques, a battery of the same storage capacity is capable of lasting longer because less of the stored energy is being used.

In Long Term Evolution (LTE), the UE needs to monitor Physical Downlink Control Channel (PDCCH) continuously (during a specified active duration every DRX cycle) and this drains UE battery power heavily. More specifically, LTE addressed this issue of battery life in part by using a two-mode Discontinuous Reception (DRX) mode. While in Radio Resource Control (RRC) Idle mode of DRX operation (known as DRX in RRC Idle or I-DRX), the UE operates to monitor PDCCH discontinuously for P-RNTI (e.g., the UE monitors P-RNTI in PDCCH, only at predetermined periods, such as every 60 ms or 100 ms) to reduce UE power consumption. In contrast to I-DRX mode which is mainly designed for page monitoring and optimized for reception only operation, Connected DRX (C-DRX) mode is designed for a RRC connection between the UE and eNodeB where the UE is expected to receive and transmit. In C-DRX mode operation, even if the traffic is downlink mobile termination (MT) data, the UE needs to transmit in the uplink to facilitate control signaling of data, such as feedback acknowledgement for the decoded data. Accordingly, the C-DRX mode provides an "ON duration" wherein the UE is operable to receive and transmit and in which the UE monitors the PDCCH.

In LTE, the UE performs a Wake Up (WU) process to transition into C-DRX mode according to a pre-determined schedule. Because during sleep time the UE's state information (such as timing synchronization and information about the radio channel) may become outdated, the UE also needs to perform operations such as AGC, TTL, FTL, channel estimation, etc., when it exits the sleep state. The WU process consumes a significant amount of power. For example, LTE C-DRX requires that the UE be fully ready for receiving and transmitting in the first subframe of the ON duration. To achieve this, the UE needs to wake up earlier, such as to perform radio frequency (RF) warm up, baseband warm up (e.g., AGC, TTL, FTL, channel estimation which is feasible because LTE CRS is always on and no extra UE/eNodeB coordination is required) to get ready for the ON duration. This requires significant warm-up or make-ready processing and drains power.

Performing the WU process according to schedule at a time when no data is actually being received is a waste of power consumption and shortens the battery life unnecessarily. That is, if no data is to be scheduled for transmission during the ON duration of the C-DRX mode, the energy for waking up and warm up for potential data transfer is wasted. Adding further to the inefficiencies of the LTE C-DRX. operation, channel state information (CSI) from a previous subframe is used until new CSI is reported by the UE. If the DRX cycle is long, stale CSI may result in poor scheduling decisions, MCS/precoder selection causing performance loss, etc.

BRIEF SUMMARY OF SOME EMBODIMENTS

Embodiments provide improved efficiency through operation to determine whether performing or completing a WU process is warranted (e.g., data is expected to be communicated from the eNB to the UE). If it is determined that a WU process is warranted, embodiments perform or complete the WU process. Additionally and/or alternatively, if it is determined that a WU process is not warranted, embodiment do not perform or complete the WU process.

In one aspect of the disclosure, a method for providing power-conserving operation of user equipment (UE) is provided. The method of embodiments includes performing a multiple stage wake up (WU) process configured to conditionally transition the UE from low power operation to communication ready operation, wherein a determination is made at a first stage of the multiple stage WU process regarding transitioning one or more receivers of the UE from the low power operation to the communication ready operation. The method of embodiments further includes transitioning the one or more receivers from the low power operation to the communication ready operation at a second stage of the multiple stage WU process if it is determined that the one or more receivers are to be transitioned to the communication ready operation at the first stage of the WU process, and ending a cycle of the WU process without performing the second stage of the WU process to transition the one or more receivers from the low power operation to the communication ready operation if it is determined that the one or more receivers are not to be transitioned to the communication ready operation at the first stage of the WU process.

In a further aspect of the disclosure, an apparatus for providing power-conserving operation of user equipment (UE) is provided. The apparatus of embodiments includes means for performing a multiple stage wake up (WU) process configured to conditionally transition the UE from low power operation to communication ready operation, wherein the means for performing the multiple stage WU process is configured to make a determination at a first stage of the multiple stage WU process regarding transitioning one or more receivers of the UE from the low power operation to the communication ready operation. The apparatus of embodiments further includes means for transitioning the one or more receivers from the low power operation to the communication ready operation at a second stage of the multiple stage WU process if it is determined that the one or more receivers are to be transitioned to the communication ready operation at the first stage of the WU process, and means for ending a cycle of the WU process without performing the second stage of the WU process to transition the one or more receivers from the low power operation to the communication ready operation if it is determined that the one or more receivers are not to be transitioned to the communication ready operation at the first stage of the WU process.

In a still further aspect of the disclosure, a non-transitory computer-readable medium having program code recorded thereon for providing power-conserving operation of user equipment (UE) is provided. The program code includes program code for causing one or more computers to perform a multiple stage wake up (WU) process configured to conditionally transition the UE from low power operation to communication ready operation, wherein a determination is made at a first stage of the multiple stage WU process regarding transitioning one or more receivers of the UE from the low power operation to the communication ready operation. The program code of embodiments further includes program code for causing the one or more computers to transition the one or more receivers from the low power operation to the communication ready operation at a second stage of the multiple stage WU process if it is determined that the one or more receivers are to be transitioned to the communication ready operation at the first stage of the WU process, and end a cycle of the WU process without performing the second stage of the WU process to transition the one or more receivers from the low power operation to the communication ready operation if it is determined that the one or more receivers are not to be transitioned to the communication ready operation at the first stage of the WU process.

In a yet further aspect of the disclosure, an apparatus for providing power-conserving operation of user equipment (UE) is provided. The apparatus includes at least one processor and a memory coupled to the at least one processor. The at least one processor of embodiments is configured to perform a multiple stage wake up (WU) process configured to conditionally transition the UE from low power operation to communication ready operation, wherein a determination is made at a first stage of the multiple stage WU process regarding transitioning one or more receivers of the UE from the low power operation to the communication ready operation. The at least one process or embodiments is further configured to transition the one or more receivers from the low power operation to the communication ready operation at a second stage of the multiple stage WU process if it is determined that the one or more receivers are to be transitioned to the communication ready operation at the first stage of the WU process, and to end a cycle of the WU process without performing the second stage of the WU process to transition the one or more receivers from the low power operation to the communication ready operation if it is determined that the one or more receivers are not to be transitioned to the communication ready operation at the first stage of the WU process.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
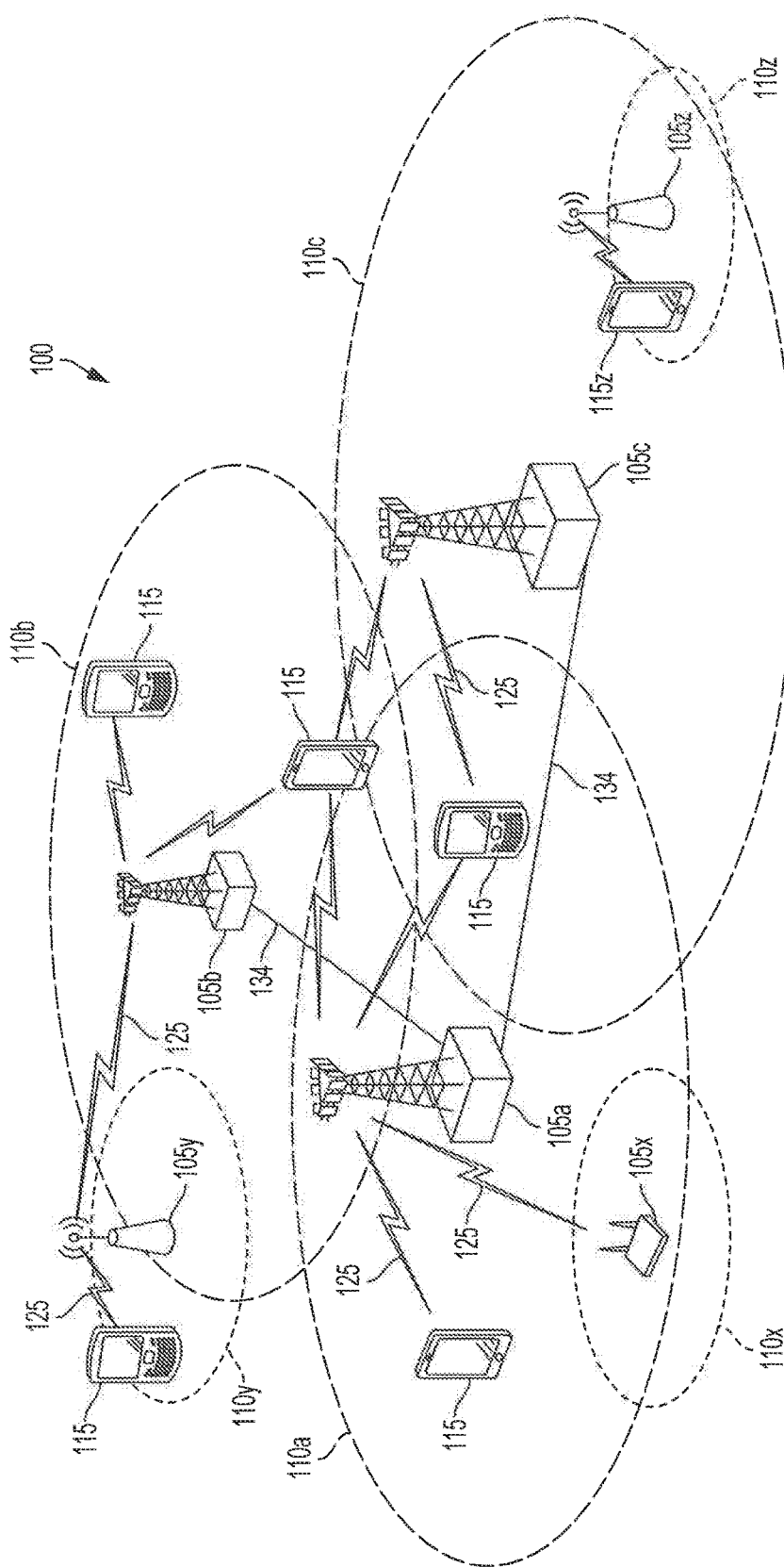
FIG. 1 is a block diagram illustrating details of a wireless communication system which embodiments of the present invention may be deployed.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000 IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements.

Turning back to FIG. 1 wireless network 100 includes a number of base stations, such as may comprise evolved node Bs (eNBs), referred to herein as eNBs 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
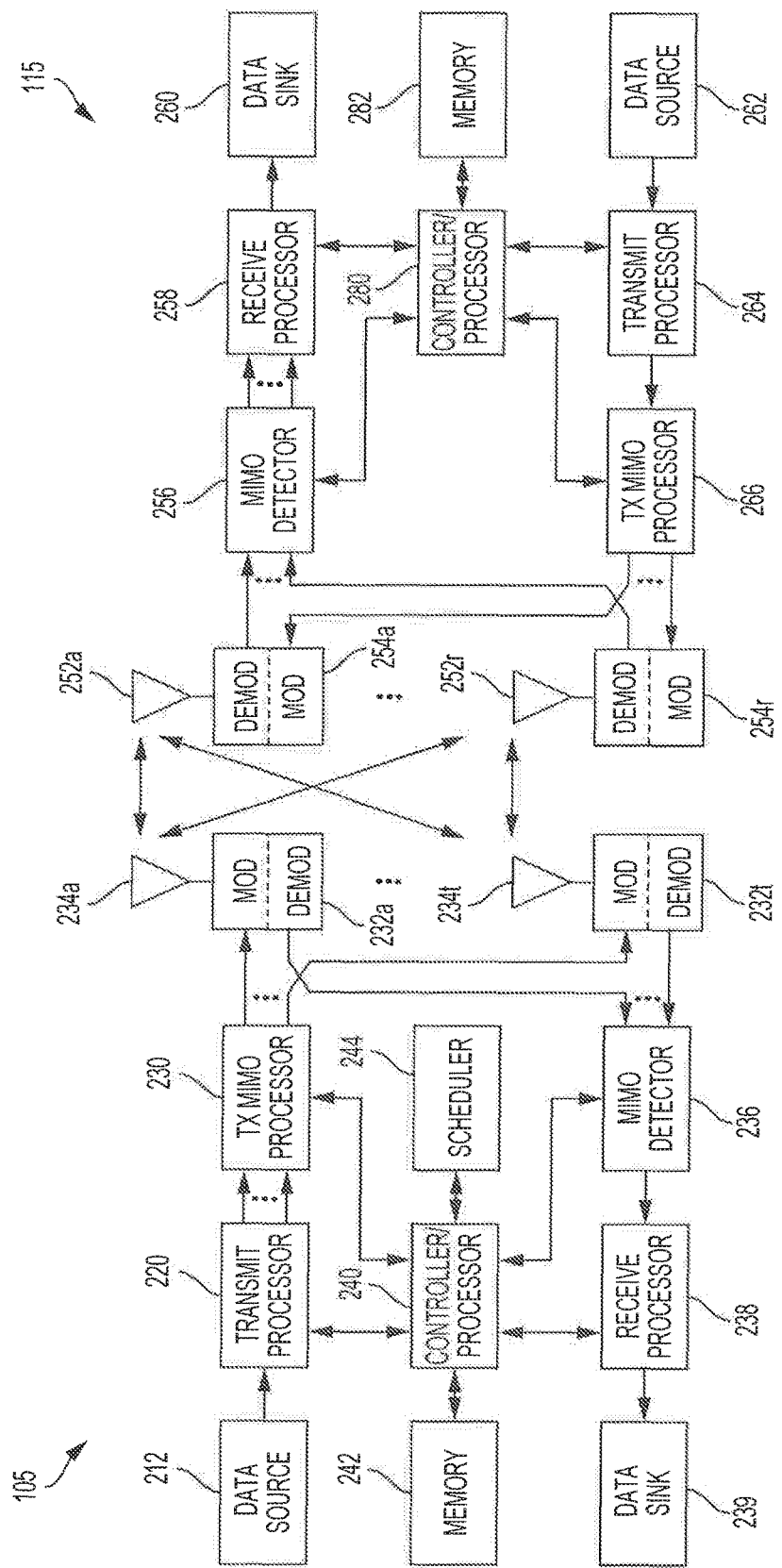
FIG. 2 is a block diagram conceptually illustrating a design of a base station/eNB and a UE configured according to one aspect of the present disclosure.
Figure 3:
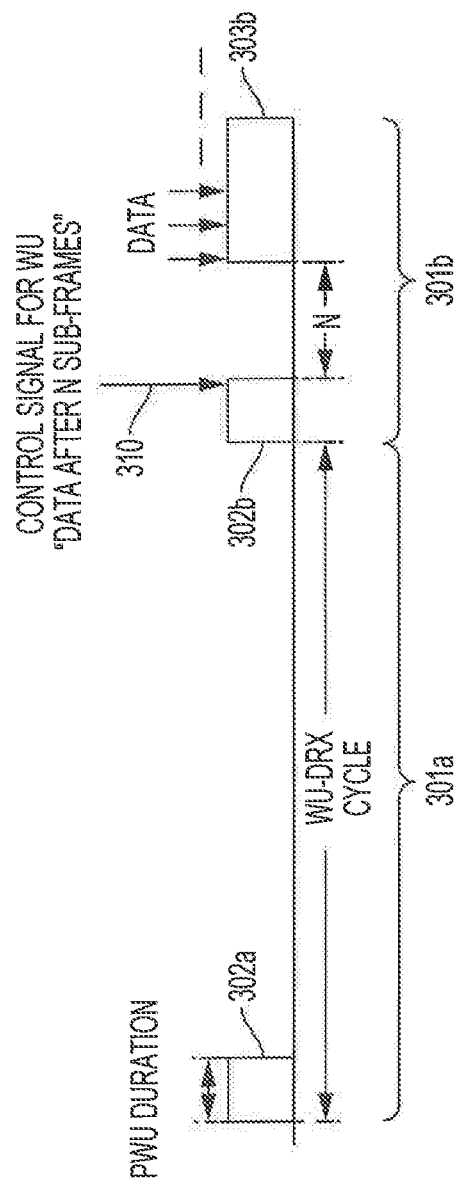
FIG. 3 illustrates operation of WU-DRX cycles according to an aspect of the present disclosure.

FIG. 2 shows a block diagram of a design of base station/eNB 105 and UE 115, which may be one of the base stations/eNBs and one of the UEs in FIG. 1. For a restricted association scenario, the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 3-9, and/or other processes for the techniques described herein. Memories 242 and 282 may store data and program codes for eNB 105 and UE 115, respectively. Scheduler 244 may schedule UEs for data transmission on the downlink and/or uplink.

In order to conserve battery life, systems and methods of embodiments herein operate to avoid performing or completing a Wake Up (WU) process prior to a connected mode of a discontinuous reception mode (e.g., C-DRX mode) upon determining that the WU process is not warranted (e.g., the WU process may not be useful for facilitating data communication) at a particular point in time. In embodiments, before waking up a receiver, systems and methods operable in accordance with concepts herein may first determine whether performing or completing a WU process is warranted (e.g., data is expected to be communicated from the eNB to the UE). If it is determined that a WU process is warranted, a system may perform or complete the WU process. Additionally and/or alternatively, if it is determined that a WU process is not warranted, the system may not perform or complete the WU process.

In embodiments, systems and methods implement a WU process as a multi-stage process (referred to herein as WU-DRX), including a Pre-Wake Up (PWU) stage and a Wake Up (WU) stage. In operation according to embodiments, PWU stage operation is performed by a UE (e.g., any of UEs 115 of FIGS. 1 and 2) first and, if the PWU stage operation determines that WU operation is warranted, WU stage operation is performed by the UE. Additionally and/or alternatively, if PWU stage operation determines that WU stage operation is not warranted, the UE may not perform the WU stage operation.

In operation of a WU-DRX process of embodiments, the PWU stage provides a PWU duration for control signal monitoring before an ON duration (e.g., an ON duration of C-DRX mode operation wherein a RRC connection between the UE and eNodeB is provided in which the UE is configured to receive and transmit). Example PWU durations are shown as PWU duration 302a of WU-DRX cycle 301a and PWU duration 302b of WU-DRX cycle 301b of FIG. 3, wherein WU-DRX cycles 301a and 301b comprise subsequent WU-DRX cycle instances of a WU-DRX process. Whether the UE wakes up (e.g., WU stage operation is performed) for the ON duration is conditional on the detection of a control signal of embodiments. For example, WU-DRX cycle 301a of FIG. 3 does not include an ON duration corresponding to PWU duration 302a. However, WU-DRX cycle 301b includes ON duration 303b corresponding to PWU duration 302b as a result of detection of control signal 310.

Implementation of a PWU stage according to embodiments may utilize a low power receive mode for control signal monitoring. For example, a low power receive mode of a UE receiver otherwise used for data communication (e.g., a traditional or main UE receiver) may be utilized for control signal monitoring. Additionally or alternatively, implementation of embodiments of a PWU stage may utilize a wake-up receiver (WUR) for control signal monitoring (e.g., a UE receiver configured to receive control signals of a PWU stage of a multi-stage WU process that is not otherwise used for data communication). For example, the WUR of embodiments receives and processes specialized signaling and/or waveforms, which reduce complexity and energy consumption. A WUR may, for example, perform non-coherent signal reception (e.g., signal reception that operates without the traditionally required information such as channel estimation). A WUR of embodiments uses substantially less power as compared to the UE's traditional or main receiver, even with respect to some UE traditional or main receiver implementations operating in a low power receive mode. The low power receive mode and WUR embodiments of a PWU stage implementation facilitate a power saving PWU duration. Configurations of secondary receivers as may be utilized as a WUR of embodiments herein are shown and described in co-pending and commonly assigned U.S. patent application No. 14/815,520, entitled "LOW POWER DISCONTINUOUS RECEPTION WITH A SECOND RECEIVER," the disclosure of which is incorporated herein by reference.

One or more control signals (e.g., control signal 310 of FIG. 3) may be provided to the UE during a PWU duration of a PWU stage of embodiments. For example, a full wake-up (WU) signal may be provided to the UE as a control signal in a PWU duration if data is to be expected during the ON duration. The full wake-up signal utilized according to embodiments may be, for example, based on sequence detection (e.g., the UE may be assigned a particular modulation symbol sequence, and detection of which may mean the UE should perform "Full WU" during ON duration), based on coding and modulation (e.g., whether the UE should perform "Full WU" may depend on a bit in a payload that is coded and modulated and transmitted on assigned resources during the PWU period, and processed correspondingly and decoded successfully by the UE), based on position detection (e.g., the existence of energy in a particular tone or combination of tones, such as using FSK, may signal whether the UE needs to perform "Full WU"), etc. In operation according to some embodiments, lack of detection of the signal may be used to indicate "Full WU". Irrespective of the particular technique for full wake-up signaling used, the UE may proceed to the WU stage of a WU-DRX process for WU processing to initiate the ON duration upon detection of full WU signaling in the PWU duration. However, the UE may return to sleep after PWU duration if full WU signaling is not detected in the PWU duration.

A full WU signal utilized with respect to a PWU stage of embodiments may be enhanced with various information useful with respect the WU process. For example, the full WU control signal may comprise information regarding control channel assignment (e.g., subband and/or search space info) for the ON duration, data channel subband assignment and/or bandwidth information, kick off resource block allocation for cross-subframe scheduling, indication of upcoming reference signals used for baseband warm-up (e.g. AGC, TTL, FTL, channel estimation), etc. Additionally or alternatively, various information useful with respect the WU process may be provided in the PWU duration separate from a full WU signal (e.g., as another control signal provided during the PWU duration).

A triggering signal is another example of the control signals that may be provided to the UE during a PWU duration of a PWU stage of embodiments. For example, a trigger signal may provide triggering of aperiodic CSI (e.g., CQI, PMI, RI) report procedure. For TDD with reciprocity, the UE may transmit a sounding reference signal (SRS) first. In operation according to embodiments, the eNB transmits CSI-RS ahead of the ON duration for the UE to warmup or make-ready the baseband as well as report accurate CSI. In operation according to embodiments, resources utilized for the procedure may be semi-statically allocated.

It should be appreciated from the foregoing that, in addition to control signals provided in the downlink to the UE, a PWU duration of a PWU stage of embodiments supports uplink transmission of control signals. For example, a UE may operate in a PWU duration to transmit one or more control signals such as SR, SRS, etc.

In operation of a WU-DRX process of embodiments, there may be a gap between a PWU duration of a PWU stage and an ON duration of a WU stage. For example, the transmitter (e.g., one or more transmitters of one of eNBs 105 in communication with UE 115) may provide a gap of N subframes between PWU duration 302b and corresponding ON duration 303b of WU-DRX cycle 301b of FIG. 3. Such a gap between a PWU duration and corresponding ON duration may be provided for various purposes. For example, the gap may be provided to enable offline (e.g., non-time-critical) and/or low power processing of one or more control signals received in a PWU duration. Additionally or alternatively, a gap between a PWU duration and corresponding ON duration may be provided to allow time for baseband warm-up or make-ready before the ON duration. For example, performing the functions of a WU stage of a WU-DRX process of embodiments may take an amount of time that spans more than the length of a subframe. Thus, a gap may be built into the transmitted frame after the grant (e.g., PDCCH) and before the transmission of data (e.g., PDSCH) to give the UE enough time to finish WU stage operation or some portion thereof.

Various considerations may be used in determining the magnitude of the gap between a PWU duration and corresponding ON duration (e.g., the value of N in the above example). For example, N is selected to allow for sufficient time for offline processing and preparing for data reception according to embodiments. As another consideration, embodiments may provide an option to allow for baseband warm-up or make-ready for data reception towards end of N.

The gap between a PWU duration and corresponding ON duration can be zero, that is, effectively non-existent, according to embodiments herein. Implementation of a zero or negligible gap between a PWU duration and corresponding ON duration may, for example, generally work for a modem architecture where the modem is capable of finishing decoding or otherwise processing the full WU signal within the PWU duration and can process data Rx/Tx immediately in the next subframe. In operation of the aforementioned example embodiment, the general concept of WU signaling can still be applied, but because the subframes associated with PWU duration and the start of the ON duration are consecutive, the full WU signal could be interpreted as a stay-awake signal. Regardless of the interpretation, the control signal provided in the PWU stage may indicate whether the UE should remain active or not for the ON duration, after the PWU duration.

The magnitude of the gap between a PWU duration and corresponding ON duration (e.g., the value of N, including instances where N=0) may be static, semi-static, or dynamic. For example, a semi-static setting for N may be provided in a RRC configuration setting. Additionally or alternatively, a control signal may dynamically indicate N (e.g., the WU-DRX cycle may be anchored on start of control duration).

The one or more control signals (e.g., full WU signals, trigger signals, etc.) of embodiments may be provided to the UE using various physical layer implementations. For example, control signals (e.g., control signal 310 of FIG. 3) may be provided to a UE during a PWU duration of a PWU stage using a configuration wherein the control signals are small and easily processed by the receiver in low power mode. Additionally or alternatively, control signals of embodiments may be multiplexed with control and/or data channels of other UEs. For example, the full WU signal utilized according to embodiments may be included in an indicator channel (ICH) or another channel similar to the paging channel that signals a grant will be scheduled in the current WU-DRX cycle. The control signals utilized according to embodiments may not only be provided by unicast transmission, but may be provided by broadcast or multicast transmission (e.g. common PDCCH). For example, the full WU signal may be broadcast/multicast in group common PDCCH (e.g., a broadcast/multicast control channel), and the UEs may demultiplex their signal based on FDM/TDM/CDM rules associated with the channel. In the case that the control signal is to be shared across multiple recipients of the channel, if at least one recipient should be signaled to perform a full wake-up, the shared control signal of embodiments may indicate that all recipients should perform a full wake-up, although this may give up some power saving opportunities as some users may perform a full wake-up unnecessarily. Accordingly, unicast control signaling may be implemented according to embodiments to maximize power saving. For example, when the system is lightly loaded, control resources may be distributed to users such that unicasting of control signals herein (e.g., the full WU signal utilized according to embodiments may be included via Downlink Control Information (DCI) in a unicast PDCCH) may be used to the maximum extent possible and multicasting may be used for control signaling as needed (e.g., only after control channel resources are depleted). In operation according to an exemplary unicast PDCCH embodiment, the payload or information useful for decoding the payload (e.g. CRC) may be scrambled with the UE-RNTI, and PDCCH for different UEs may also be separated by FDM/TDM/CDM. In accordance with some embodiments where DCI is used to carry a full WU signal, PDSCH may be utilized to carry some information (e.g., various information useful with respect the WU process) and reduce the burden on DCI capacity. Embodiments operable to multiplex one or more control signals herein with control and/or data channels of other UEs provide implementations facilitating offline receiver processing conducive for low power consumption and may allow leveraging of hardware optimized for I-DRX mode operation.

A WUR configuration, as mentioned above, of embodiments is another example of a physical layer implementation for providing the one or more control signals (e.g., control signal 310 of FIG. 3) of a WU-DRX cycle to the UE. In accordance with embodiments, specialized signaling and/or waveform (e.g., as may be adapted to reduce receiver complexity) utilized by a WUR may provide substantially lower power operation during a PWU duration. For example, in an exemplary embodiment, non-coherent signaling/reception is utilized by a WUR having reduced receiver complexity for low power PWU stage operation. A WUR implementation having reduced receiver complexity may comprise an energy detection based receiver, such as may be incorporated into a RF transceiver chip (e.g., to provide for a baseband modem waking up only for traffic). If a significant percentage of the WU-DRX cycles are traffic-less, such a low power WUR may be beneficial.

Specialized signaling and/or waveform utilized as the one or more control signals of a WU-DRX cycle (e.g., full WU signal, trigger signal, etc.) may be multiplexed with control and/or data channels of other UEs according to embodiments. Multiplexing on-off keying (OOK) signals within OFDM, for example, may readily be performed by both the eNB modulator and a low power WUR implementation of embodiments. Detail with respect to multiplexing/demultiplexing of a signal as may be used as a WU signal according to embodiments herein is shown and described in U.S. patent application Ser. No. 15/053,679 entitled "DOWNLINK MULTIPLEXING AND MAC SIGNAL FOR A SYSTEM WITH DEVICES OPERATING WITH AND WITHOUT LOW POWER COMPANION RECEIVERS," filed Feb. 25, 2016, the disclosure of which is incorporated herein by reference.

It should be appreciated that a WUR having reduced receiver complexity may not be capable of decoding certain data, such as DCI in PDCCH. However, a UE of embodiments may desire to perform some maintenance type of operations from time to time. For example, the UE may perform Radio Link Monitoring (RLM) (e.g., for a radio link failure condition), Channel State information processing and Feedback (CSF), Radio Resource Management (RRM) (e.g., neighbor cell measurement and/or search, serving cell measurement), and/or maintaining time and frequency synchronization (Sync) based on reference signal, which may dependent on the radio channel and/or network. Such maintenance may be best handled by a traditional or main receiver operating at its normal power level as opposed to a WUR (e.g., some embodiments of a WUR may provide processing not well suited for performing some types of maintenance activities). Accordingly, embodiments implementing a WUR may utilize another receiver of the UE to periodically perform one or more one or more maintenance type operations.

UE power consumption associated with the WU-DRX process may be affected by the particular physical channel used for WU-DRX control signaling, the PWU duration, the search space, the duration of the gap, and the percentage of WU-DRX cycles in which no data is transmitted to the UE. As an example of UE power consumption being affected by the particular physical channel used for control signaling, if using DCI in PDCCH, the following processing elements may be involved: CRS and PDCCH processing: RxFFT, Channel Estimation (Ch Est), tracking loops (AGC/TTL/FTL), as well as PDCCH demodulating and decoding. However, if CRS and PDCCH processing is made self-contained in a power-optimized subsystem, the potential power saving would be greater. With respect to UE power consumption being affected by PWU duration, it should be appreciated that a PWU duration configured as short as possible and/or narrowband provides for efficiency. Based on a 5G self-contained subframe structure, 1~2 subframes (0.5~1 ms) is sufficient for a PWU duration according to some embodiments herein. In regard to UE power consumption being affected by search space, the search space of embodiments may be configured to be limited to as few as possible for efficiency. Embodiments provide special radio network temporary identifiers (RNTIs) for scrambling (e.g., similar to paging). With respect to UE power consumption being affected by the duration of the gap between a PWU duration and corresponding ON duration (e.g., the magnitude of N in the gap of FIG. 3), if the gap is too long, sleep current may wipe out the gain. Assuming only light sleep, deep light sleep (DLS) may be performed because the duration of the gap (e.g., N) is likely below tens of ms and offline processing needs to take place. Accordingly, the duration of the gap between a PWU duration and corresponding ON duration may be on the order of few ms according to embodiments. Regarding UE power consumption being affected by the percentage of WU-DRX cycles in which no data is transmitted to the UE, the UE can return to deep sleep after a PWU duration in which no control signal is detected, which leads to power saving. Accordingly, generally the higher the percentage of WU-DRX cycles in which no data is transmitted to the UE, the lower the power consumption.

Figure 4:
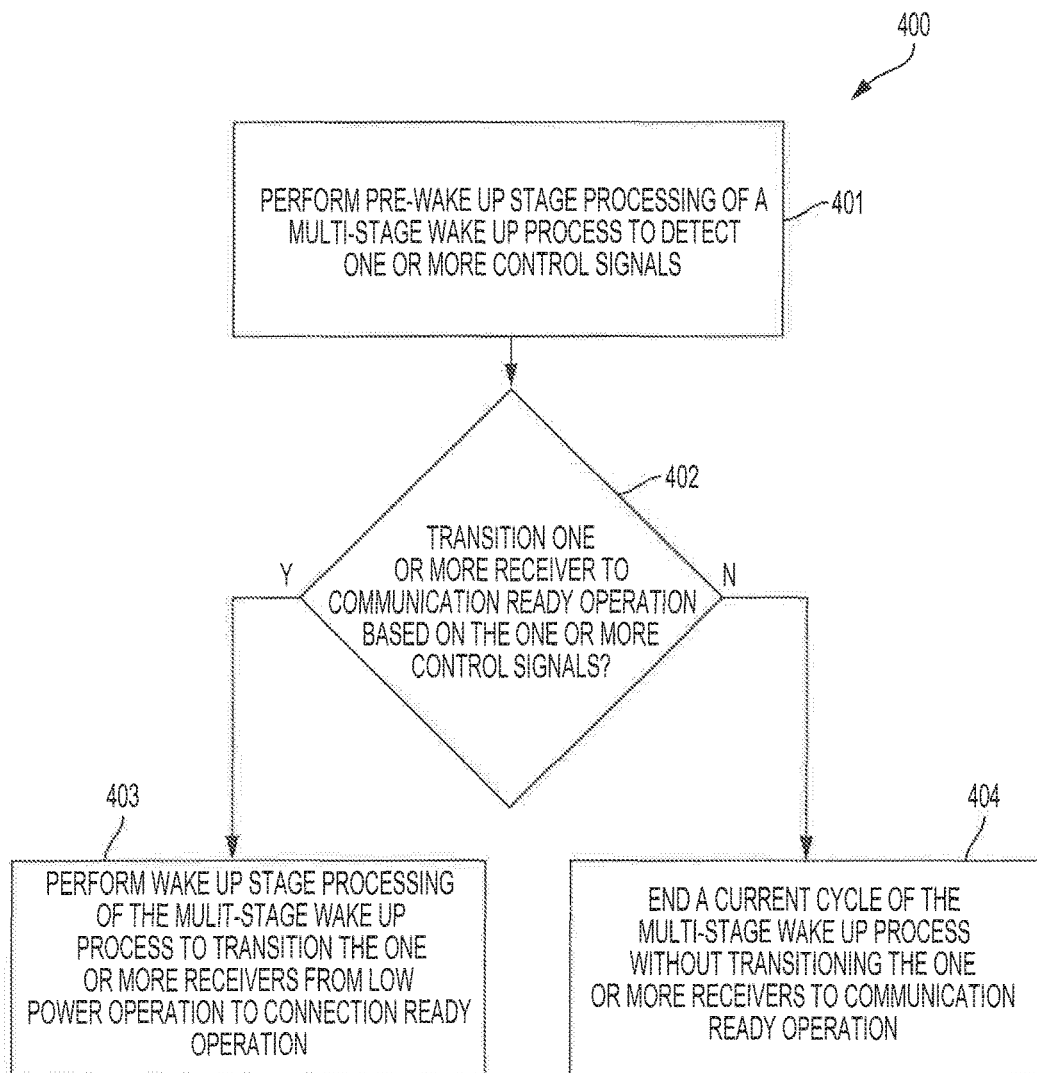
FIG. 4 is a flow diagram conceptually illustrating operation of a WU-DRX cycle according to an aspect of the present disclosure.

FIG. 4 shows an exemplary flow diagram illustrating operation of an embodiment of a multi-stage WU-DRX process, including a PWU stage and a WU stage as described above, as flow 400. Flow 400 may, for example, be performed by logic and a receiver (e.g., controller/processor 258 and receive processor 258 of FIG. 2) of a UE (e.g., any of UEs 115 of FIGS. 1 and 2).

In operation of the WU-DRX multi-stage process provided by the illustrated embodiment of flow 400, the PWU stage provides a PWU duration for control signal monitoring prior to operation of one or more receivers in a communication ready state (e.g., before an ON duration of a C-DRX mode wherein a connection between the UE and eNB is provided in which the UE is configured to receive and transmit). Accordingly, at block 401 of flow 400 the UE performs PWU stage processing to detect one or more WU-DRX control signals (e.g., full WU signal, trigger signal, etc.). For example, one or more control signals (e.g., control signal 310 of FIG. 3) may be provided to the UE during a PWU duration of a PWU stage. Accordingly, the UE may utilize a receiver configured for low power operation (e.g., a low power receive mode of a receiver of receive processor 258, a WUR receiver of receiver processor 258 configured to perform non-coherent signal reception, etc.) to monitor for the one or more control signals during the PWU duration.

At block 402 of the embodiment of flow 400 illustrated in FIG. 4, the PWU stage processing determines if one or more receivers (e.g., a main or conventional receiver of receiver processor 258) of the UE are to be transitioned to a communication ready state. For example, a one or more control signals (e.g., a full WU signal) may be provided to the UE in a PWU duration if data is to be expected during the ON duration and the one or more control signals may be detected by the UE at block 401. Logic (e.g., controller/processor 280) of the UE may analyze the operation of the PWU stage processing (e.g., determine if one or more WU-DRX control signals are detected, analyze information provided by and/or with detected WU-DRX control signals, etc.) to determine if one or more receivers of the UE are to be transitioned to a communication ready operation.

When it is determined that the one or more receivers are to be transitioned to communication ready operation, operation according to the embodiment of flow 400 illustrated in FIG. 4 proceeds to block 403 to perform WU stage processing of the WU-DRX process. In operation of WU stage processing according to the illustrated embodiment, the UE transitions the one or more receivers from low power operation to connection ready operation (e.g., controller/processor 280 may control a traditional or main receiver of receive processor 258 to exit a sleep state). Thereafter, the UE may operate to receive and transmit data during an ON duration of a C-DRX mode, for example.

When it is determined that the one or more receivers are not to be transitioned to communication ready operation, operation according to the embodiment of flow 400 illustrated in FIG. 4 proceeds to block 404 to end the illustrated cycle of the WU-DRX process. In operation of the illustrated embodiment, if it is determined that the one or more receivers are not to be transitioned to the communication ready operation during the PWU stage processing, the cycle of the WU-DRX process is ended without performing WU stage processing. Thereafter, the UE may return to sleep (e.g., full sleep or deep sleep) after the PWU stage processing.

It should be appreciated that flow 400 of FIG. 4 illustrates operation of a single cycle of the exemplary WU-DRX process. Multiple WU-DRX cycles may be implemented (e.g., flow 400 repeated), such as in association with one or more events (e.g., in response to a trigger, anchored on start of control duration, etc.), according to a predetermined schedule, etc. Additionally or alternatively, WU-DRX cycles may be implemented in association with other processes, such as in a Full DRX cycle as described below with respect to FIG. 8.

Figure 5:
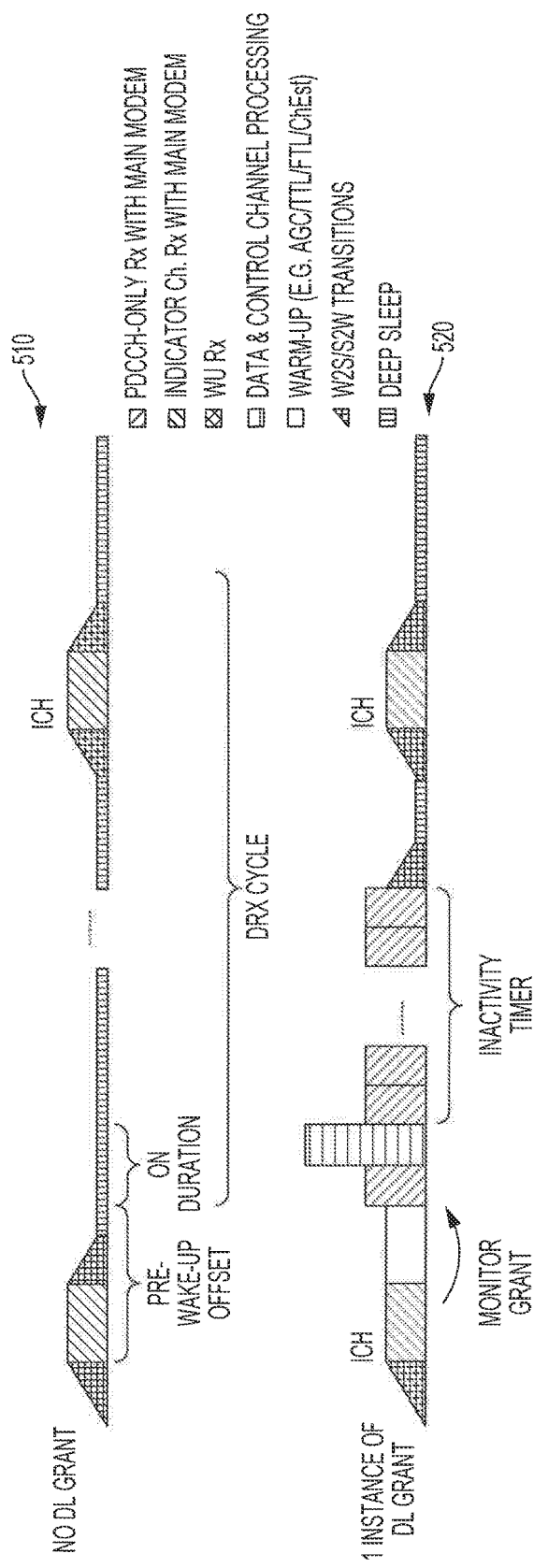
FIGS. 5 and 6 illustrate power profiles for a UE receiver operating in accordance with WU-DRX processes according to some aspects of the present disclosure.

FIG. 5 shows exemplary power profiles for a UE receiver operating in accordance with a WU-DRX process using a WU control signal included on an ICH (or PDCCH) of embodiments. In particular, graph 510 shows an exemplary power profile for a WU-DRX cycle in which no downlink grant is provided (e.g., WU-DRX cycle 301a of FIG. 3). Graph 520 shows an exemplary power profile for a WU-DRX cycle in which an instance of a downlink grant is provided (e.g., WU-DRX cycle 301b of FIG. 3). In the example of FIG. 5, the wake up indicator channel (WU-ICH) signals that a grant will be scheduled and UE should monitor for the ON duration. It should be appreciated that the illustrations in FIG. 5 are simplified and that a low power mode for PDCCH processing may be done offline (e.g., outside of the PWU duration) and span more than 1 subframe, wherein an offset (e.g., the gap between a PWU duration and corresponding ON duration described above) may be defined between the PWU duration and a corresponding ON duration.

Figure 6:
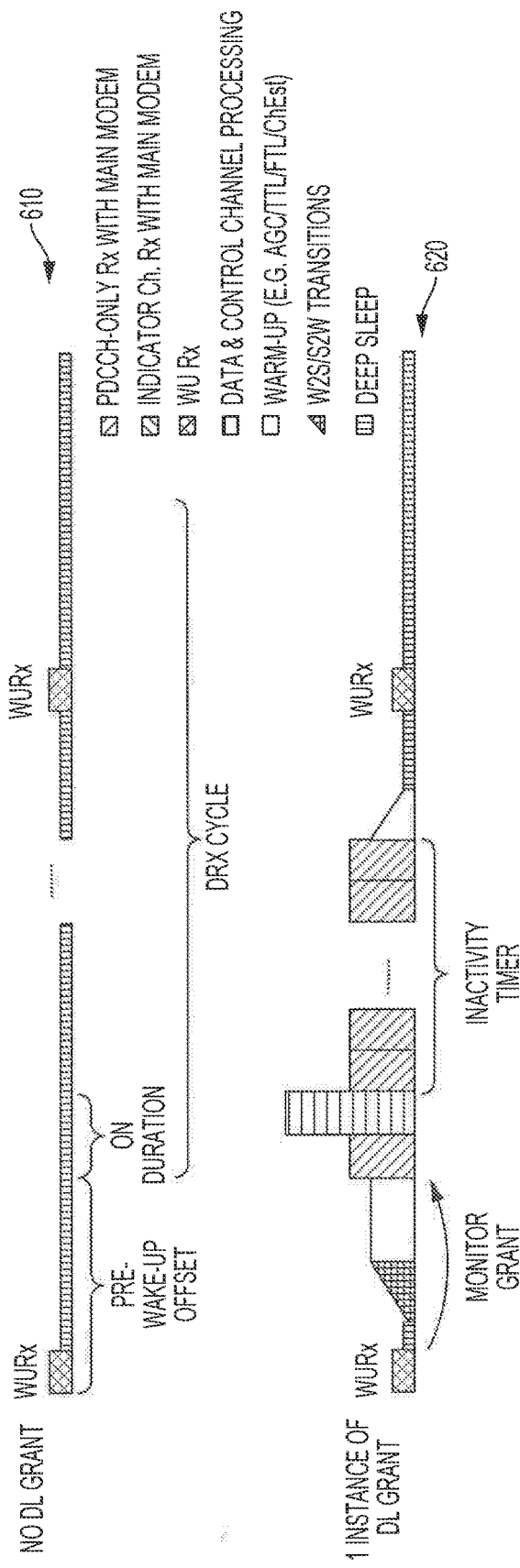

FIG. 6 shows exemplary power profiles for a UE receiver operating in accordance with a WU-DRX process using a WUR of embodiments. In particular, graph 610 shows an exemplary power profile for a WU-DRX cycle in which no downlink grant is provided (e.g., WU-DRX cycle 301a of FIG. 3). Graph 620 shows an exemplary power profile for a WU-DRX cycle in which an instance of a downlink grant is provided (e.g., WU-DRX cycle 301b of FIG. 3). It can be appreciated from the graphs of FIG. 6 that an inactivity timer (e.g., an inactivity timer utilized in the ON duration to determine when the UE receiver transitions from the ON duration and returns to sleep) may be shortened in an implementation utilizing a WUR of embodiments because it is as power efficient to configure a shorter WU-DRX cycle, while still achieving the same or lower latency. As a further enhancement, instead of relying on inactivity timer, the eNB of embodiments may issue a special DRX command to put UE to sleep.

Figure 7:
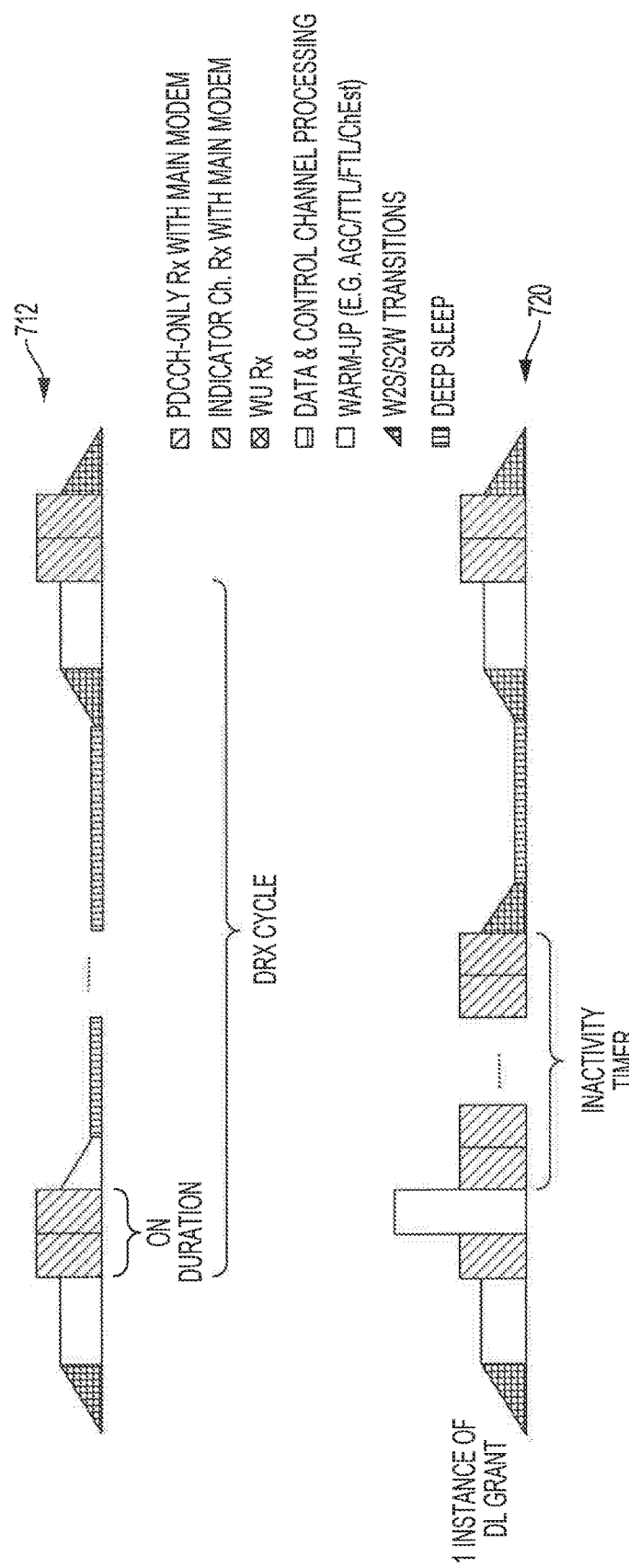
FIG. 7 illustrates power profiles for a UE receiver operating in accordance with a LTE DRX process.

FIG. 7 shows exemplary power profiles for a UE receiver operating in accordance with a LTE C-DRX process for comparison to the power profiles provided by embodiments of a WU-DRX process herein. In particular, graph 710 shows an exemplary power profile for a C-DRX cycle in which no downlink grant is provided. Graph 720 shows an exemplary power profile for a C-DRX cycle in which an instance of a downlink grant is provided. As can be seen by comparison to the corresponding graphs of FIGS. 5 and 6, both the WU control signal and WUR implementations of the exemplary WU-DRX process embodiments provide substantial power savings over the LTE C-DRX process.

Various robust WU-DRX configurations may be provided according to embodiments of the present disclosure. Robust WU-DRX configurations may, for example, be configured to provide low power operation during intervals of inactivity in an ON duration, to provide support for periodic radio/network updates and/or to provide an alternative technique for transitioning to instances of ON durations, etc.

In an example of a robust WU-DRX configuration in which low power operation is provided during intervals of inactivity in an ON duration, one or more receivers of the UE may be controlled to refrain from downlink monitoring (e.g., entering a sleep mode) during inactivity intervals within ON durations. Operation to provide low power operation during inactivity intervals as may be implemented by a WU-DRX configuration in accordance with the concepts herein is shown and described in U.S. patent application Ser. No. 15/188,720, entitled "MACRO AND MICRO DISCONTINUOUS RECEPTION," the disclosure of which is incorporated herein by reference.

If a PWU stage is performed using a low-power WUR, the WUR may not be capable of performing some of the "maintenance" type operations, as previously mentioned. Additionally, if the WU-DRX cycle is very short (e.g., <40 ms), periodic radio/network updates may not need to be performed during every WU-DRX cycle (e.g., a short DRX cycle may be driven by low latency requirement, decoupled from high mobility requirements), regardless of whether a WUR is used or not. Accordingly, a robust WU-DRX configuration operable to support periodic radio/network updates and/or to provide an alternative technique for transitioning to instance of ON durations implements Full DRX cycles (e.g., DRX cycles in which the full UE modem wakes up) in combination with the WU-DRX cycles of a WU-DRX process. The Full DRX cycle of embodiments provides forced (e.g., periodic) DRX cycle operation (e.g., C-DRX cycles) providing instances of an ON duration to supplement the WU-DRX cycles. However, the instances of ON durations for the WU-DRX cycles remain conditional on WU control signals detected in the PWU duration. The implementation of Full DRX cycles according to embodiments may provide a fall-back DRX scheme (e.g., the full UE modem wakes up to monitor ON duration with a periodicity not larger than a full DRX cycle) in case WU-DRX fails (e.g., in a situation where the PWU stage chronically suffers missed detection) and/or for periodic network "maintenance" (e.g. RLM/RRM/periodic CSI), thereby enhancing the robustness of the WU-DRX process.

Figure 8:
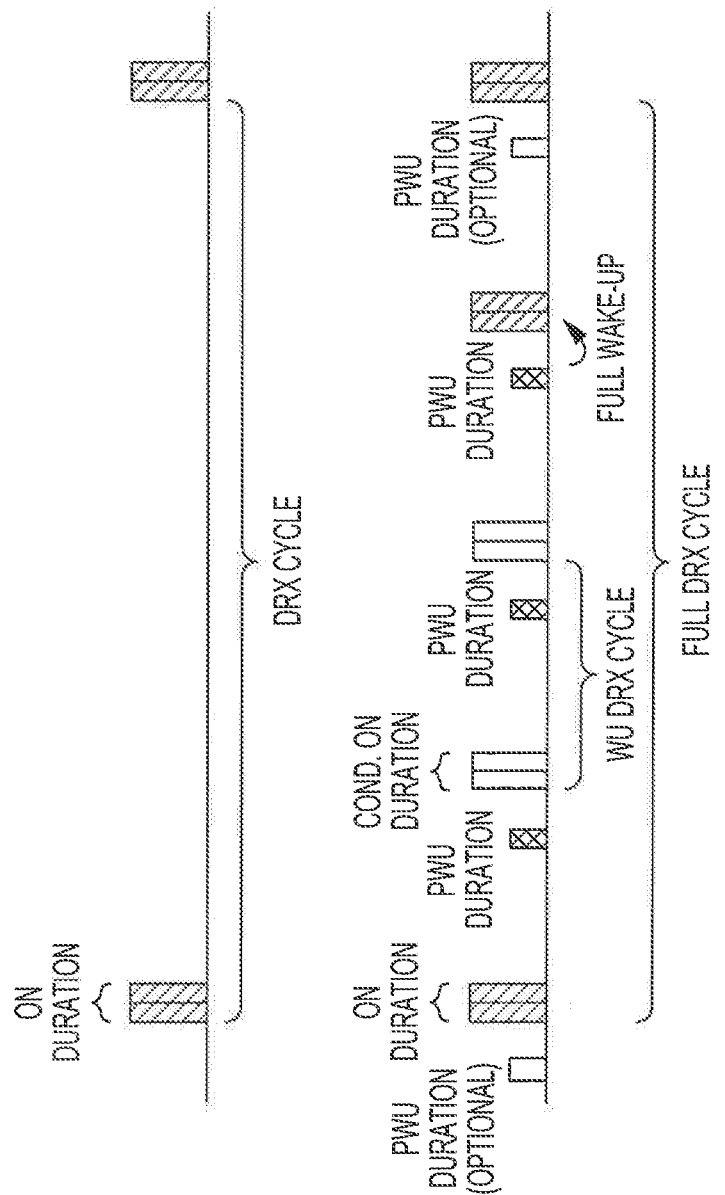
FIGS. 8 and 9 illustrate implementations of Full DRX cycles in combination with the WU-DRX cycles of WU-DRX processes according to aspects of the present disclosure.

FIG. 8 shows an exemplary implementation of a Full DRX cycle in combination with the WU-DRX cycles of a WU-DRX process herein. The Full DRX cycle of FIG. 8 spans multiple WU-DRX cycles. For example, the Full DRX cycle is equal to N * (WU-DRX cycle), wherein N=4 in the illustrated example. In the illustrated example, the ON duration is set to 2 subframes.

In operation according to embodiments, RLM/CSF/RRM/Sync periodicity may be aligned to the Full DRX cycle. For example, the WU-DRX cycle may be 20 ms, but the periodic RLM/CSF/RRM operations may be performed every 320 ms in correspondence with the Full DRX cycle. It is also possible for each operation (RLM or CSF or RRM or Sync) to be aligned to different multiples of the full DRX cycle, according to embodiments. For example, RLM may be done every full DRX cycle, and RRM may be done every two full DRX cycles, adapting to the requirement for each operation. In embodiments utilizing a WUR for the PWU stage of a WU-DRX cycle, the main UE modem may be controlled to wake up regardless of detection of a control signal in the PWU duration in order to perform channel-dependent operations. Embodiments may operate to provide on-demand RLM/CSF/RRM triggered by a control signal in the PWU duration.

Periodic CSI may be aligned to the longer cycle of the Full DRX cycle (e.g., multiple of WU-DRX cycles). In embodiments, a CSI reference signal (CSI-RS) may be transmitted by the eNB and received by the UE for period CSI measurement and reporting. Such a CSI-RS may be used for radio link monitoring (RLM) according to embodiments.

In operation according to embodiments, enhancements to RLM, Sync, and RRM operations may be provided by allowing a faster cadence than the Full DRX cycle. A control signal detected in the PWU duration may also be conditionally utilized to assist radio link monitoring (RLM) operation. For example, if the level of a WU control signal detected in the PWU duration is strong, it can be used to infer a good radio link condition. If a synchronization signal is available and suited for processing by the receiver employed for the PWU duration, synchronization operation may also be performed during the PWU duration of a WU-DRX cycle. If such synchronization signal from the serving and neighbor cells can be detected, some of the radio resource management (RRM) functionalities can be performed during the PWU duration of a WU-DRX cycle.

In instances where a WU-DRX cycle is aligned to a Full DRX cycle, the PWU duration of the WU-DRX cycle may be made optional since the wake up operation has to occur. Embodiments, however, may nevertheless continue to utilize the PWU duration of WU-DRX cycles that are aligned to Full DRX cycles, such as where the control signals detected during a PWU duration carry additional information other than wake-up indication.

Figure 9:
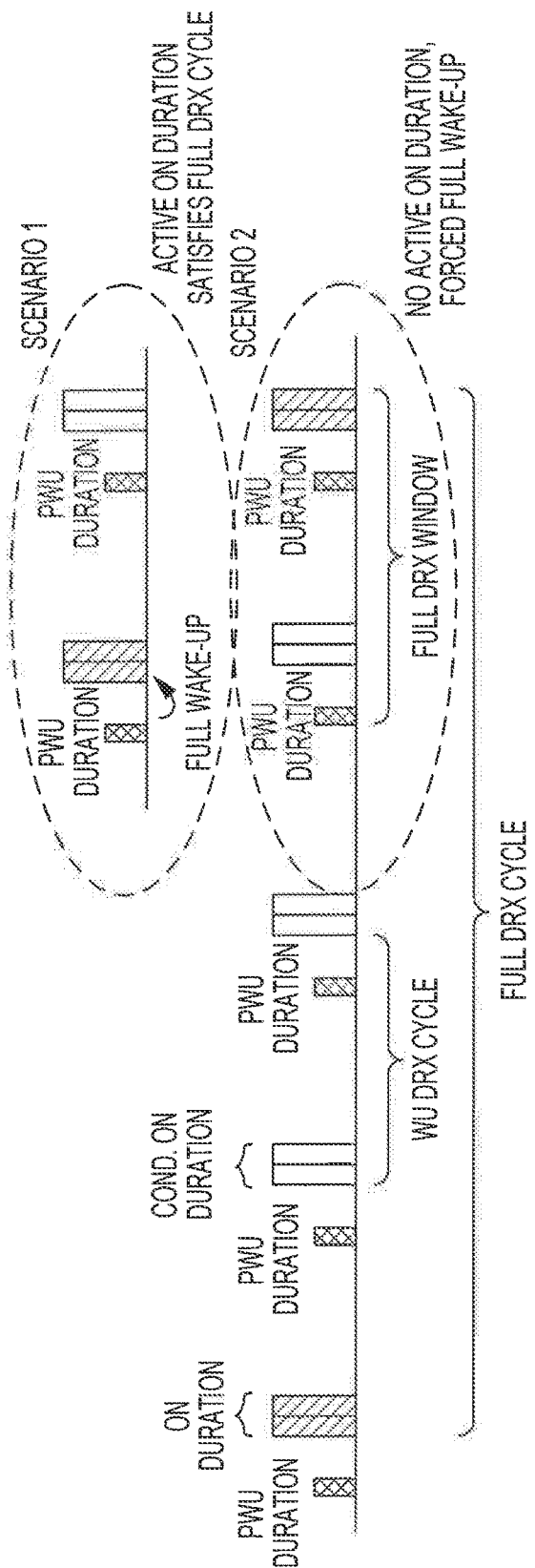

FIG. 9 shows an exemplary implementation of a. Full DRX cycle in combination with the WU-DRX cycles of a WU-DRX process wherein the Full DRX cycle is flexible. Similar to the embodiment illustrated in FIG. 8, the embodiment of FIG. 9 provides a Full DRX cycle that is a multiple of the WU-DRX cycle. However, instead of forcing the WU-DRX cycle which is aligned to the Full DRX cycle to have active ON duration (i.e. forced wake-up), a window in terms of a number of WU-DRX cycles is defined. This window in the illustrated embodiment is aligned to the end of the Full DRX cycle. Accordingly, if any of an ON duration of a WU-DRX cycle is active (e.g., having been triggered by WU control signal) within the window, the robustness condition is satisfied. In a first scenario illustrated in FIG. 9, a PWU stage triggered wake up occurs on the first subframe in the window and the full UE modem is not forced to wake-up again for the remainder of the window. In a second scenario illustrated in FIG. 9, at the final PWU duration within the window, no wake up has been triggered by the WU-DRX cycle and a wake up is forced for the last ON duration before the window ends. A benefit of this flexible scheme is higher timing flexibility for RLM/CSF/RRM/Sync operations, generally resulting in reduced full wake up. Periodic radio/network update activities may additionally or alternatively be anchored to any one of the active ON duration within the window.

It should be appreciated that, although embodiments herein have been discussed with reference to a multi-stage WU-DRX process in which a PWU stage is implemented to determine whether to initiate an ON duration of C-DRX mode operation, WU-DRX processes may be utilized with respect to various other operations. For example, a PWU stage may be implemented to determine whether to initiate an ON duration of I-DRX mode operation according to concepts herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof. The operations described with respect to performing WU-DRX process functionality described with reference to FIGS. 3-6, 8, and 9 may be performed by the functional blocks of FIG. 2, such as by operation of processors, electronics devices, hardware devices, electronics components, logical circuits, memories, software codes, and/or firmware codes thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for providing power-conserving operation via a multiple stage wake up (WU) process of user equipment (UE), the method comprising:
    transitioning one or more receivers of the UE from a low power sleep state to a communication ready state at a second stage of the multiple stage WU process based upon control signal monitoring by the UE in a pre-wake up (PWU) state of a first stage of the multiple stage WU process when it is determined that the one or more receivers of the UE are to be transitioned to the communication ready state at the first stage of the WU process, wherein the communication ready state provides a connection between the UE and another station in which the UE is configured to receive and transmit data communications, and wherein UE operation in the PWU state provides the control signal monitoring at a power level intermediate to UE operations in the low power sleep state and the communication ready state and
    ending a cycle of the multiple stage WU process without performing the second stage of the WU process to transition the one or more receivers to the communication ready state when it is determined that the one or more receivers are not to be transitioned to the communication ready state at the first stage of the multiple stage WU process.

2. The method of claim 1, wherein the first stage of the WU process controls the one or more receivers to operate in a low power receive mode to detect a wake up control signal, and wherein the second stage of the WU process controls transitioning the one or more receivers to the communication ready state.

3. The method of claim 1, wherein the first stage of the WU process controls a wake up receiver of the UE to detect a wake up control signal, and wherein the second stage of the WU process controls transitioning the one or more receivers to the communication ready state.

4. The method of claim 1, further comprising:
    monitoring for a wake up control signal during the first stage of the WU process, wherein the determination regarding transitioning the one or more receivers of the UE to the communication ready operation is based at least in part on detecting the wake up control signal.

5. The method of claim 4, wherein the wake up control signal comprises a control signal multiplexed with one or more signal for another UE.

6. The method of claim 4, wherein the wake up control signal comprises a waveform to be processed based on non-coherent detection by a receiver of the UE.

7. The method of claim 4, wherein the wake up control signal comprises information that indicates whether additional data is expected to be transmitted to the UE.

8. The method of claim 7, wherein the wake up control signal information comprises information selected from the group consisting of control channel assignment data, data channel subband assignment, and bandwidth information.

9. The method of claim 4, further comprising:
    instituting a gap between an end of a duration of the first stage of the WU process and initiation of a duration where the UE is operable to receive and transmit when the wakeup control signal is detected.

10. The method of claim 9, wherein the gap comprises a number of subframes selected to enable processing of one or more control signals received in the duration of the first stage of the WU process.

11. The method of claim 9, wherein the gap comprises a number of subframes selected to facilitate make-ready of the one or more receivers for the communication ready operation.

12. The method of claim 1, further comprising:
    forcing the one or more receivers to transition to the communication ready state from time to time outside of control of a wake up discontinuous reception (WU DRX) cycle comprising the first and second stages of the WU process.

13. The method of claim 12, further comprising:
    performing multiple instances of the WU DRX cycle in a full discontinuous reception (Full DRX) cycle including the multiple instances of the WU DRX cycle and a cycle forcing the one or more receivers to transition to the communication ready operation outside of control of the WU DRX cycles.

14. A non-transitory computer-readable medium having program code recorded thereon for providing power-conserving operation via a multiple stage wake up (WU) process of user equipment (UE), wherein when the program code is executed by one or more computers causes the one or more computers to:
    transition one or more receivers of the UE from a low power sleep state to a communication ready state at a second stage of the multiple stage WU process based upon control signal monitoring by the UE in a pre-wake up (PWU) state of a first stage of the multiple stage WU process when it is determined that the one or more receivers of the UE are to be transitioned to the communication ready state at the first stage of the WU process, wherein the communication ready state provides a connection between the UE and another station in which the UE is configured to receive and transmit data communications, and wherein the UE operation in the PWU state provides the control signal monitoring at a power level intermediate to UE operations in the low power sleep state and the communication ready state; and end a cycle of the multiple stage WU process without performing the second stage of the WU process to transition the one or more receivers to the communication ready state when it is determined that the one or more receivers are not to be transitioned to the communication ready state at the first stage of the multiple stage WU process.

15. The non-transitory computer-readable medium of claim 14, wherein the first stage of the WU controls the one or more receivers to operate in a low power receive mode to detect a wake up control signal, and wherein the second stage of the WU process controls transitioning the one or more receivers to the communication ready state.

16. The non-transitory computer-readable medium of claim 14, wherein the first stage of the WU process controls a wake up receiver of the UE to detect a wake up control signal, and wherein the second stage of the WU process controls transitioning the one or more receivers to the communication ready state.

17. The non-transitory computer-readable medium of claim 14, wherein the program code further comprises program code for causing the one or more computers to:
monitor for a wake up control signal during the first stage of the WU process, wherein the determination regarding transitioning the one or more receivers of the UE to the communication ready operation is based at least in part on detecting the wake up control signal.

18. The non-transitory computer-readable medium of claim 17, wherein the wake up control signal comprises a waveform to be processed based on non-coherent detection by a receiver of the UE.

19. The non-transitory computer-readable medium of claim 17, wherein the program code further comprises program code for causing the one or more computers to:
institute a gap between an end of a duration of the first stage of the WU process and initiation of a duration where the UE is operable to receive and transmit when the wakeup control signal is detected.

20. The non-transitory computer-readable medium of claim 17, wherein the program code further comprises program code for causing the one or more computers to:
force the one or more receivers to transition to the communication ready state from time to time outside of control of a wake up discontinuous reception (WU DRX) cycle comprising the first and second stage of the WU process.

21. The non-transitory computer-readable medium of claim 20, wherein the program code further comprises program code for causing the one or more computers to:
perform multiple instances of the WU DRX cycle in a full discontinuous reception (Full DRX) cycle including the multiple instances of the WU DRX cycle and a cycle forcing the one or more receivers to transition to the communication ready operation outside of control of the WU DRX cycles.

22. A apparatus for providing power-conserving operation via a multiple stage wake up (WU) process of user equipment (UE), the apparatus comprising: at least one processor; and a memory coupled to the at least one processor, wherein the at least one processor is configured:
to transition one or more receivers of the UE from a low power sleep state to a communication ready state at a second stage of the multiple stage WU process based upon control signal monitoring by the UE in a pre-wake up (PWU) state of a first stage of the multiple stage WU process when it is determined that the one or more receivers of the UE are to be transitioned to the communication ready stage at the first stage of the WU process, wherein the communication ready state provides a connection between the UE and another station in which the UE is configured to receive and transmit data communications, and wherein UE operation in the PWU state provides the control signal monitoring at a power level intermediate to UE operations in the low power sleep state and the communication ready state; and
to end a cycle of the multiple stage WU process without performing the second stage of the WU process to transition the one or more receivers to the communication ready state when it is determined that the one or more receivers are not to be transitioned to the communication ready state at the first stage of the multiple stale WU process.

23. The apparatus of claim 22, wherein the first stage of the WU process controls the one or more receivers to operate in a low power receive mode to detect a wake up control signal, and wherein the second stage of the WU process controls transitioning the one or more receivers to the communication ready state.

24. The apparatus of claim 22, wherein the first stage of the WU process controls a wake up receiver of the UE to detect a wake up control signal, and wherein the second stage of the WU process controls transitioning the one or more receivers to the communication ready operation state.

25. The apparatus of claim 22, wherein the at least one processor is further configured:
to monitor for a wake up control signal during the first stage of the WU process, wherein the determination regarding transitioning the one or more receivers of the UE to the communication ready operation is based at least in part on detecting the wake up control signal.

26. The apparatus of claim 25, wherein the wake up control signal comprises a control signal multiplexed with one or more signal for another UE.

27. The apparatus of claim 25, wherein the wake up control signal comprises a waveform to be processed based on non-coherent detection by a receiver of the UE.

28. The apparatus of claim 25, wherein the at least one processor is further configured:
to institute a gap between an end of a duration of the first stage of the WU process and initiation of a duration where the UE is operable to receive and transmit when the wakeup control signal is detected.

29. The apparatus of claim 22, wherein the at least one processor is further configured:
to force the one or more receivers to transition to the communication ready state from time to time outside of control of a wake up discontinuous reception (WU DRX) cycle comprising the first and second stages of the WU process.

30. The apparatus of claim 29, wherein the at least one processor is further configured:
to perform multiple instances of the WU DRX cycle in a full discontinuous reception (Full DRX) cycle including the multiple instances of the WU DRX cycle and a cycle forcing the one or more receivers to transition to the communication ready operation outside of control of the WU DRX cycles.

* * * * *